(12) United States Patent
Kim

(10) Patent No.: US 11,535,217 B2
(45) Date of Patent: Dec. 27, 2022

(54) MASTER CYLINDER FOR ELECTRONIC BRAKE SYSTEM

(71) Applicant: MANDO CORPORATION, Gyeonggi-do (KR)

(72) Inventor: Jin Seok Kim, Gyeonggi-do (KR)

(73) Assignee: HL MANDO CORPORATION, Gyeonggi-do (KR)

( * ) Notice: Subject to any disclaimer, the term of this patent is extended or adjusted under 35 U.S.C. 154(b) by 0 days.

(21) Appl. No.: 17/436,590

(22) PCT Filed: Mar. 9, 2020

(86) PCT No.: PCT/KR2020/003224
§ 371 (c)(1),
(2) Date: Sep. 4, 2021

(87) PCT Pub. No.: WO2020/180165
PCT Pub. Date: Sep. 10, 2020

(65) Prior Publication Data
US 2022/0169220 A1    Jun. 2, 2022

(30) Foreign Application Priority Data
Mar. 7, 2019 (KR) .................. 10-2019-0026482

(51) Int. Cl.
*B60T 11/16* (2006.01)
*B60T 8/40* (2006.01)

(52) U.S. Cl.
CPC ............... *B60T 8/40* (2013.01); *B60T 11/16* (2013.01)

(58) Field of Classification Search
CPC . B60T 8/32; B60T 11/16; B60T 8/326; B60T 8/40
See application file for complete search history.

(56) References Cited

U.S. PATENT DOCUMENTS 5,729,979 A    3/1998   Shaw et al.

FOREIGN PATENT DOCUMENTS

JP    2006-256408    9/2006
KR    10-0987146    10/2010
(Continued)

OTHER PUBLICATIONS

International Search Report for PCT/KR2020/003224 dated Jul. 6, 2020 and its English translation from WIPO (now published as WO 2020/180165).

(Continued)

*Primary Examiner* — Thomas E Lazo
*Assistant Examiner* — Daniel S Collins
(74) *Attorney, Agent, or Firm* — Ladas & Parry, LLP

(57) ABSTRACT

Provided is a master cylinder for an electronic brake system. The master cylinder for the electronic brake system includes a pedal simulator provided between a first master piston and a second master piston and having a rubber member that provides reaction force to a brake pedal, and the first master piston includes a first piston and a second piston coupled to be movable relative to each other and having a communication channel to allow a pressing medium to flow between a reservoir and a first master chamber, a communication channel sealing member configured to block a portion of the communication channel according to a relative movement of the first piston and the second piston, and an elastic member configured to provide elastic force in a direction in which the first piston and the second piston are spaced apart.

15 Claims, 7 Drawing Sheets

(56) References Cited

FOREIGN PATENT DOCUMENTS

| KR | 10-2011-0036109 | | | 4/2011 | | |
|----|---|---|---|---|---|---|
| KR | 10-2014-0082490 | | | 7/2014 | | |
| KR | 20150051365 | A | * | 5/2015 | ............ | B60T 8/4081 |
| WO | WO-2020184925 | A1 | * | 9/2020 | .............. | B60T 11/16 |

OTHER PUBLICATIONS

Written Opinion of the International Searching Authority for PCT/KR2020/003224 dated Jul. 6, 2020 and its English translation by Google Translate (now published as WO 2020/180165).

* cited by examiner

[Fig. 1]
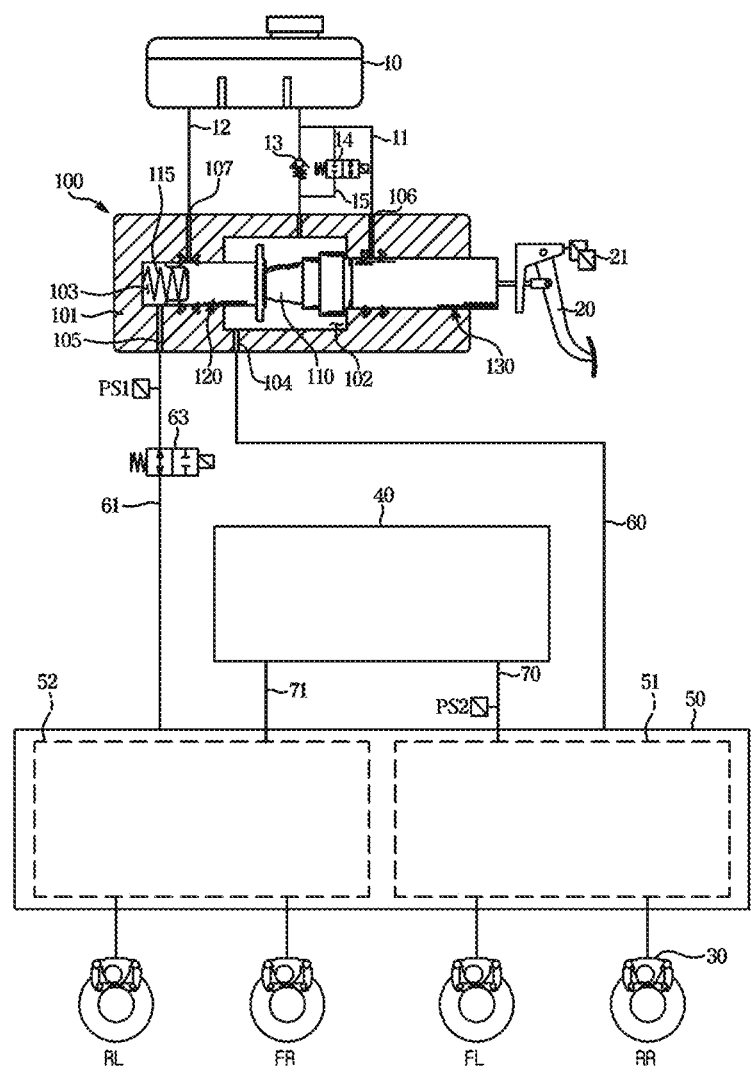

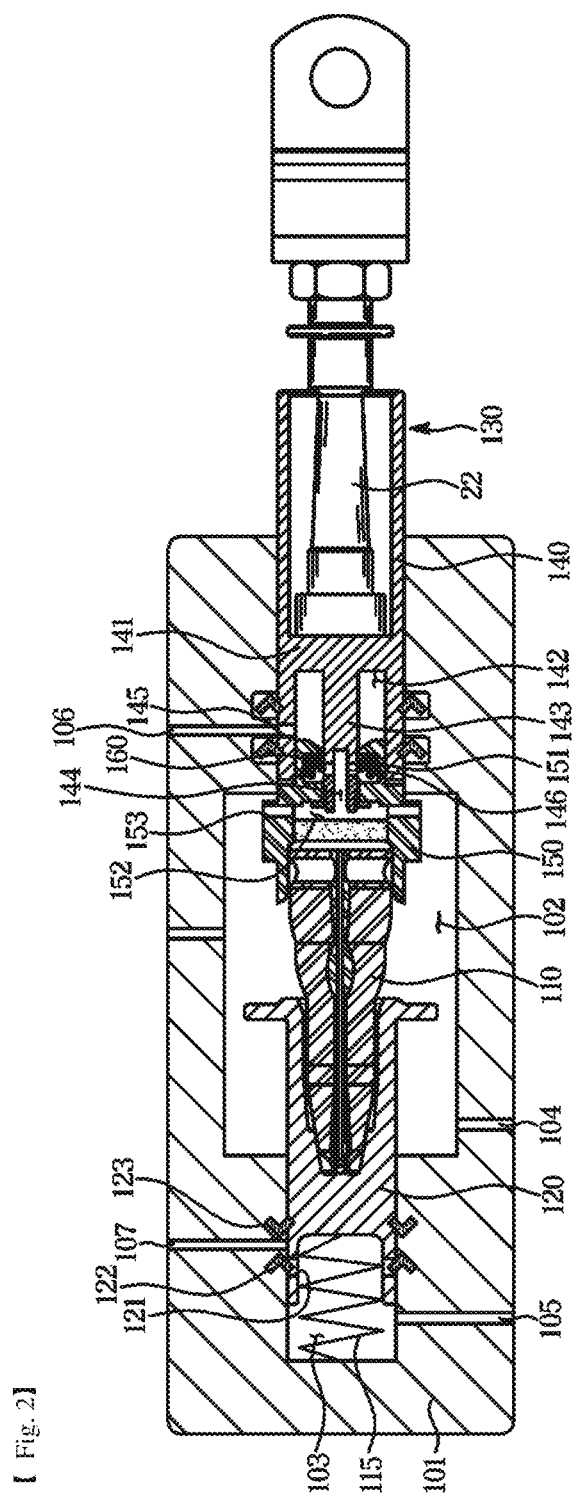
[Fig. 2]

[Fig. 3]
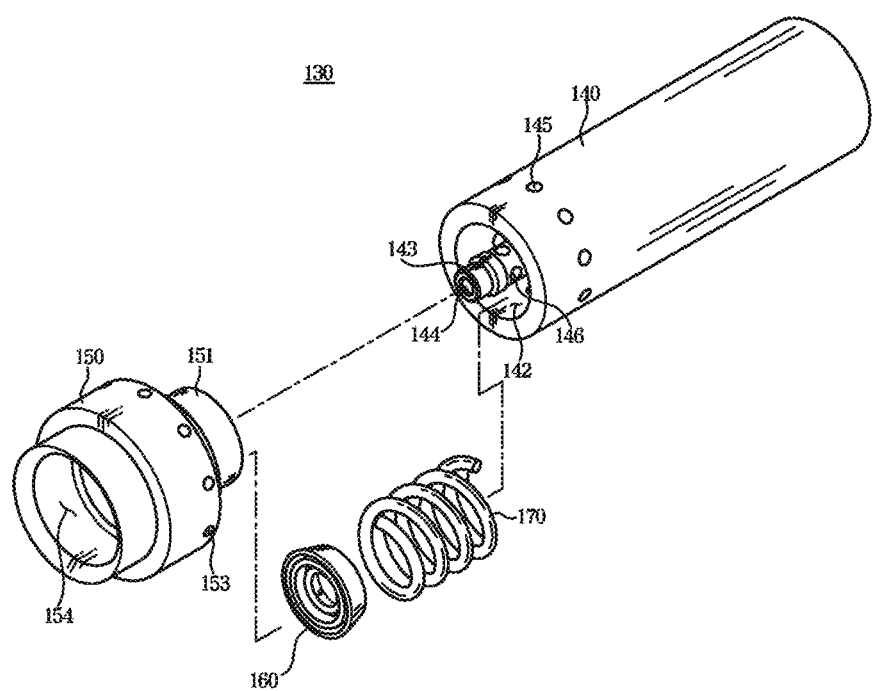

[Fig. 4]
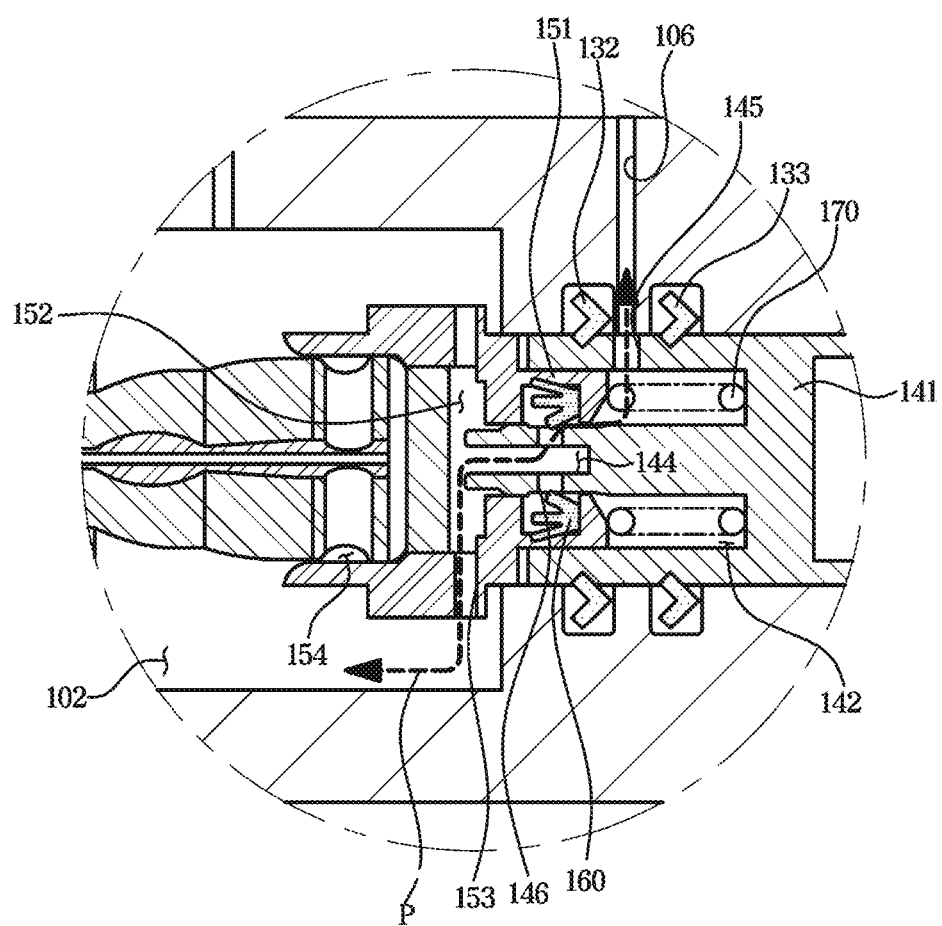

[Fig. 5]
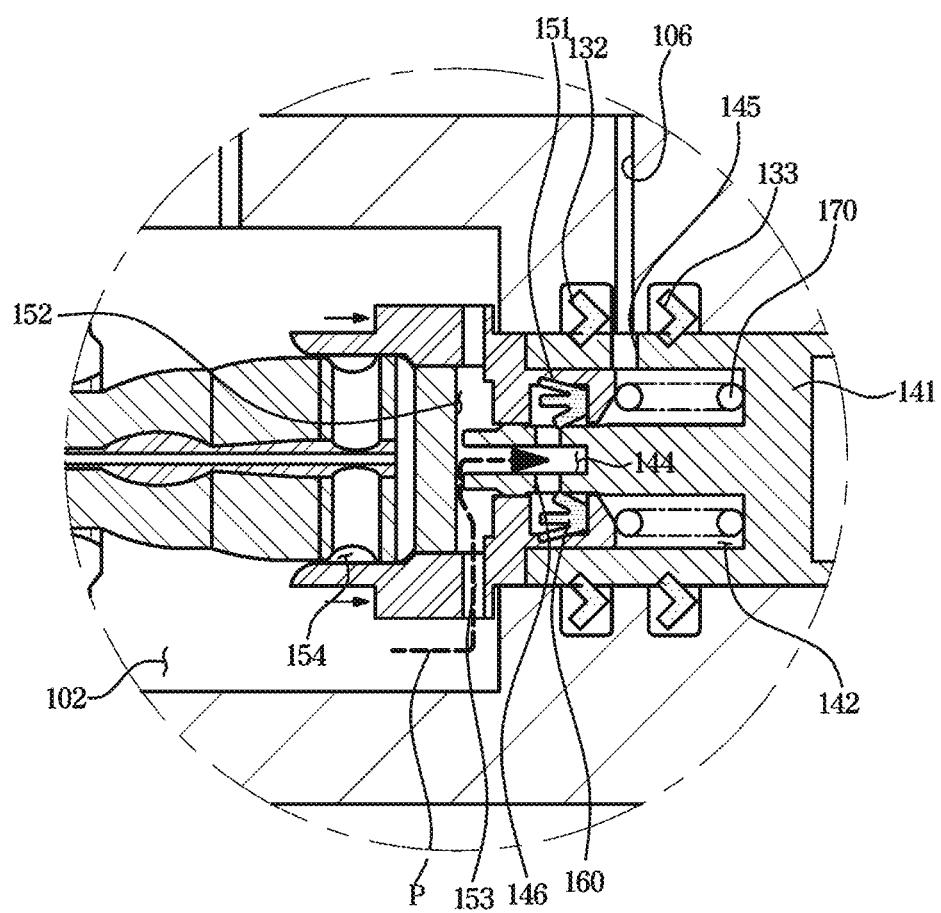

[Fig. 6]
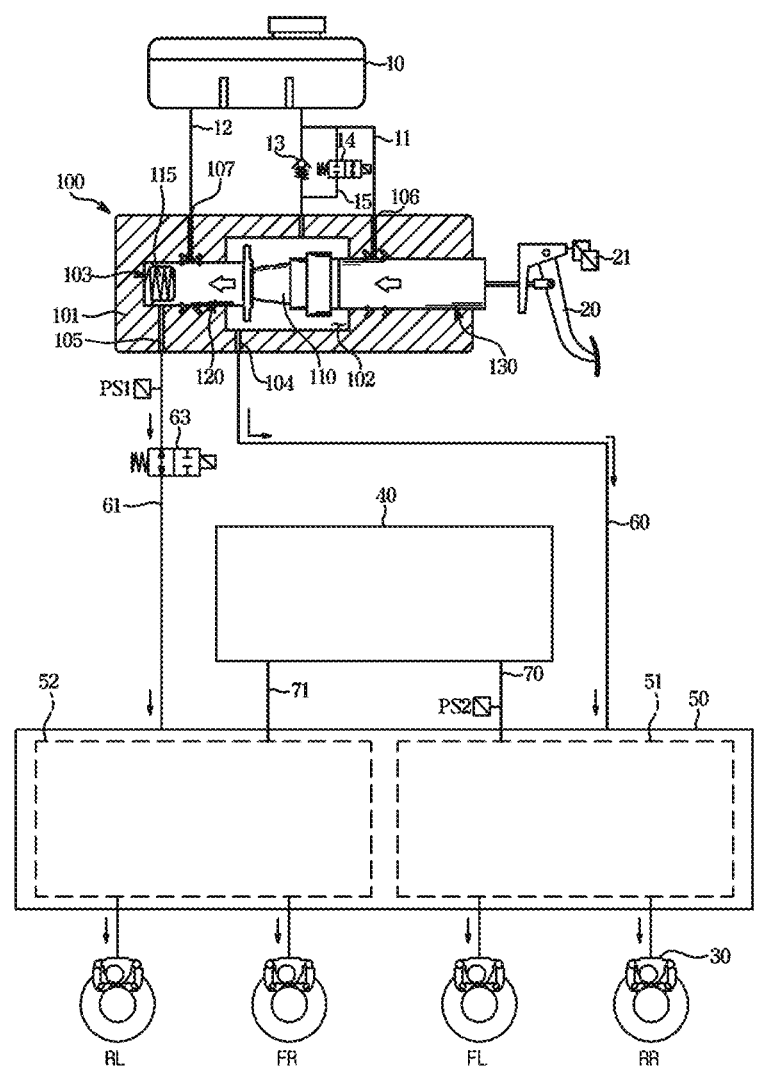

[Fig. 7]
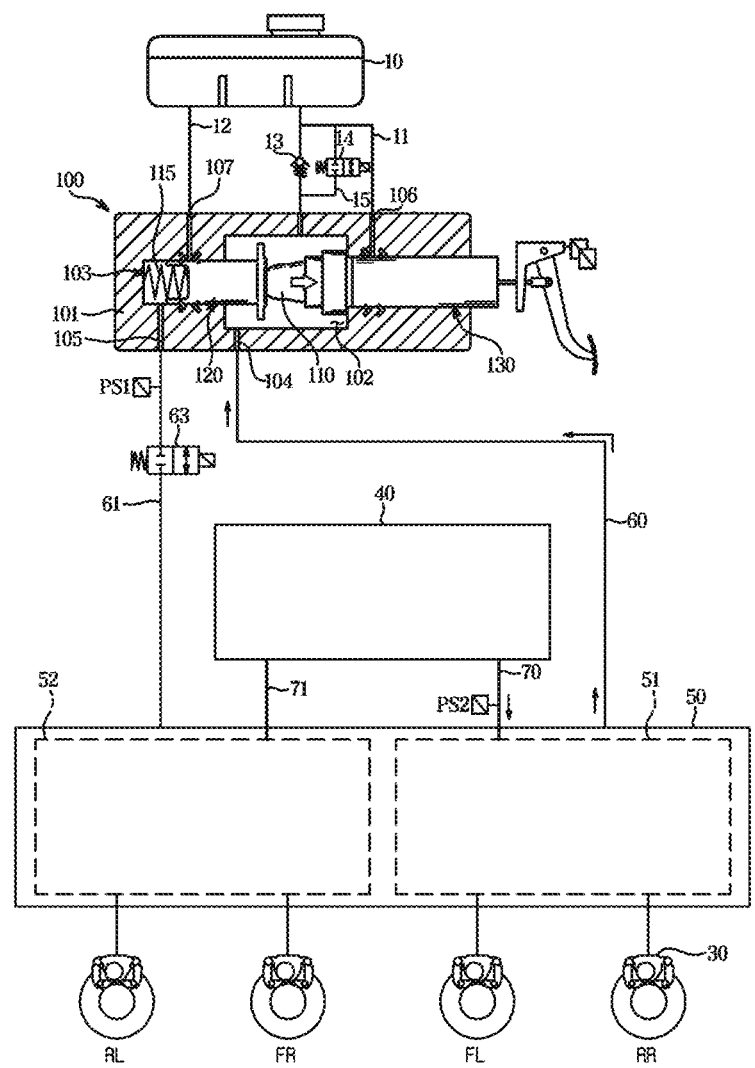

MASTER CYLINDER FOR ELECTRONIC BRAKE SYSTEM

TECHNICAL FIELD

The disclosure relates to an electronic brake system, and more specifically, to a master cylinder for an electronic brake system that generates braking force using an electrical signal corresponding to a displacement of a brake pedal.

BACKGROUND ART

A brake system for braking of a vehicle is essentially mounted to a vehicle, and a variety of systems have been recently proposed for safety of drivers and passengers.

In a conventional brake system, when a driver operates a brake pedal, hydraulic pressure for braking is supplied to wheel cylinders using a booster mechanically connected to the brake pedal. Due to the high market demand for various brake functions, however, an electronic brake system provided with a hydraulic pressure supply device and a method of operating the same have recently come into widespread use. Once a driver operates a brake pedal, the hydraulic pressure supply device of the electronic brake system senses a displacement of the brake pedal through a pedal displacement sensor, and receives an electrical signal indicating the driver's braking intention from the pedal displacement sensor, such that the hydraulic pressure required for braking is supplied to wheel cylinders.

In the electronic brake system and the method of operating the same described above, in a normal operation mode, a driver's brake pedal operation is provided as an electrical signal and the hydraulic pressure supply device electrically operates and is controlled based on the electrical signal to generate and transmit hydraulic pressure required for braking to the wheel cylinders.

As described above, since the electronic brake system and the method of operating the same electrically operate and are controlled, complicated and various braking functions may be performed. However, when a technical malfunction occurs in application components, hydraulic pressure required for braking is not stably generated, which may threaten the safety of passengers. Accordingly, when an element is broken or out of control, the electronic brake system and the method of operating the same enter an abnormal operation mode, and in this case, a driver's brake pedal operation is required to be directly linked to wheel cylinders. That is, in the abnormal operation mode of the electronic brake system and the method of operating the same, when the driver applies pedal effort to the brake pedal, hydraulic pressure required for braking is required to be immediately generated and transmitted directly to the wheel cylinders.

DISCLOSURE

Technical Problem

Therefore, it is an aspect of the disclosure to provide a master cylinder for an electronic brake system that may implement a fallback mode and a diagnostic mode in an electronic brake system.

According to an aspect of the disclosure, there is provided a master cylinder for an electronic brake system, including: a cylinder block having a first master chamber pressurized by a first master piston and a second master chamber pressurized by a second master piston, the first master piston moving relative to an operation of a brake pedal; a first hydraulic port formed in the cylinder block to provide a pressing medium of a reservoir to the first master chamber; and a pedal simulator provided between the first master piston and the second master piston and having a rubber member that provides reaction force to the brake pedal, wherein the first master piston includes: a first piston and a second piston coupled to be movable relative to each other and having a communication channel to allow the pressing medium to flow between the first hydraulic port and the first master chamber; a communication channel sealing member installed between the first piston and the second piston to block a portion of the communication channel according to a relative movement of the first piston and the second piston; and an elastic member configured to provide elastic force in a direction in which the first piston and the second piston are spaced apart to prevent the communication channel from being blocked by the communication channel sealing member.

The master cylinder for the electronic brake system further including: a sealing member installed in the cylinder block to prevent the first hydraulic port and the communication channel from communicating with each other when the first piston moves forward toward the second piston.

In a fallback mode, the first piston moves forward by a pedal effort of the brake pedal to block the first hydraulic port, and in a diagnostic mode, the second piston moves backward by pressure of the pressing medium flowed into the first master chamber and the communication channel is blocked by the communication channel sealing member.

The first piston includes a first communication hole that communicates with the first hydraulic port, a first communication chamber that communicates with the first communication hole inside a front portion of the first piston, a communication rod that protrudes from a center of the first communication chamber toward the second piston and has a second communication chamber connected to the first master chamber through the second piston, and a second communication hole formed in the communication rod to allow the first communication chamber and the second communication chamber to communicate with each other.

The communication channel sealing member blocks the first communication chamber and the second communication hole from communicating with each other when the second piston moves backward.

The elastic member has both ends supported by the first piston and the second piston, respectively, while being received in the first communication chamber, to provide elastic force in the direction in which the first piston and the second piston are spaced apart.

The communication channel sealing member is installed in an inner circumference of a rear portion of the second piston, the first communication chamber is slidably coupled to an outer circumference of the rear portion of the second piston, a third communication chamber that communicates with the second communication chamber is formed inside of the second piston, and the third communication chamber communicates with the first master chamber through a third communication hole formed in the second piston.

The communication channel includes the first communication hole, the first communication chamber, the second communication hole, the second communication chamber, the third communication chamber, and the third communication hole.

A receiving part formed to be concave is provided inside a front portion of the second piston to receive a rear end of the rubber member.

Advantageous Effects

The electronic brake system according to an aspect of the disclosure can reduce a size and weight of a product due to a pedal simulator built into a master cylinder and stably implement a fallback mode and a diagnostic mode.

DESCRIPTION OF DRAWINGS

FIG. 1 is a schematic view illustrating an electronic brake system according to an embodiment of the disclosure.

FIG. 2 is a cross-sectional view illustrating a master cylinder according to an embodiment of the disclosure.

FIG. 3 is an exploded perspective view illustrating a first master piston of a master cylinder according to an embodiment of the disclosure.

FIG. 4 is a partially enlarged view illustrating a first master piston of a master cylinder in an idle state according to an embodiment of the disclosure.

FIG. 5 is a diagram illustrating a state where a communication channel of a first master piston is blocked according to an embodiment of the disclosure.

FIG. 6 is an operational state diagram illustrating an electronic brake system in a fallback mode according to an embodiment of the disclosure.

FIG. 7 is an operational state diagram illustrating an electronic brake system in a diagnostic mode according to an embodiment of the disclosure.

BEST MODE OF THE DISCLOSURE

Hereinafter, embodiments of the present disclosure will be described in detail with reference to the accompanying drawings. The following embodiments are provided to fully convey the spirit of the disclosure to a person having ordinary skill in the art to which the present disclosure belongs. The disclosure is not limited to the embodiments shown herein but may be embodied in other forms. The drawings are not intended to limit the scope of the disclosure in any way, and the size of components may be exaggerated for clarity of illustration.

FIG. 1 is a schematic view illustrating an electronic brake system according to an embodiment of the disclosure. FIG. 2 is a cross-sectional view illustrating a master cylinder according to an embodiment of the disclosure. FIG. 3 is an exploded perspective view illustrating a first master piston of a master cylinder according to an embodiment of the disclosure. FIG. 4 is a partially enlarged view illustrating a first master piston of a master cylinder in an idle state according to an embodiment of the disclosure. FIG. 5 is a diagram illustrating a state where a communication channel of a first master piston is blocked according to an embodiment of the disclosure.

Referring to FIGS. 1 to 5, the electronic brake system according to an embodiment of the disclosure includes a reservoir 10, a master cylinder 100, one or more wheel cylinders 30, a hydraulic pressure supply device 40, a hydraulic control unit 50 and an electronic control unit (ECU). Here, the reservoir 10 stores a pressing medium, and the master cylinder 100 pressurizes or discharges the pressing medium included therein according to a pedal effort of a brake pedal 20. The wheel cylinders 30 perform braking of respective wheels RR, RL, FR, and FL upon receiving hydraulic pressure of the pressing medium. The hydraulic pressure supply device 40 generates hydraulic pressure of the pressing medium by mechanically operating upon receiving an electrical signal indicating a driver's braking intention from a pedal displacement sensor 21 sensing a displacement of the brake pedal 20. The hydraulic control unit 50 controls the hydraulic pressure applied to the wheel cylinders 30, and the ECU controls the hydraulic pressure supply device 40 and various valves based on hydraulic pressure information and pedal displacement information.

A pedal simulator 110 is built into the master cylinder 100, and when a driver applies a pedal effort to the brake pedal 20 for braking a vehicle, the master cylinder 100 provides the driver with reaction force corresponding to the pedal effort for stable pedal feel, and pressurizes and discharges the pressing medium included therein.

The master cylinder 100 includes a cylinder block 101, a first master piston 130, a second master piston 120 and the pedal simulator 110. The cylinder block 101 forms a chamber therein, and the first master piston 130 and the second master piston 120 are spaced apart in a row inside the cylinder block 101. The pedal simulator 110 is provided between the first master piston 130 and the second master piston 120.

A multi-stage bore is formed inside the cylinder block 101, and the bore in the cylinder block 101 includes a first master chamber 102 where the pressing medium is compressed by the first master piston 130 and a second master chamber 103 where the pressing medium is compressed by the second master piston 120.

The first master chamber 102 has a relatively bigger diameter than the second master chamber 103, and the pedal simulator 110 made of a rubber member is built into the first master chamber 102.

The pedal simulator 110 is provided between the first master piston 130 and the second master piston 120, and provides the driver with pedal feel through elastic restoring force generated when compressed.

The pressing medium in the first master chamber 102 may be flowed into and discharged from a first backup port 104 and the pressing medium in the second master chamber 103 may be flowed into and discharged from a second backup port 105.

When the hydraulic pressure supply device 40 may not operate normally, the first backup port 104 and the second backup port 105 are connected to backup passages 60 and 61 to directly supply hydraulic pressure of the pressing medium discharged from the master cylinder 100 to the hydraulic control unit 50.

A master spring 115 is placed in the second master chamber 103. When displacement occurs in the second master piston 120 according to an operation such as braking, etc., the master spring 115 is compressed to store elastic force, and then when the operation such as braking is released, the master spring 115 returns the second master piston 120 to an original position by the stored elastic force.

The pressing medium in the first master chamber 102 and in the second master chamber 103 may be flowed into and discharged through a first hydraulic port 106 and a second hydraulic port 107 formed in the cylinder block 101.

Modes of the Disclosure

Hereinafter, embodiments of the present disclosure will be described in detail with reference to the accompanying drawings. The following embodiments are provided to fully convey the spirit of the disclosure to a person having ordinary skill in the art to which the present disclosure belongs. The disclosure is not limited to the embodiments shown herein but may be embodied in other forms. The drawings are not intended to limit the scope of the disclosure in any way, and the size of components may be exaggerated for clarity of illustration.

FIG. 1 is a schematic view illustrating an electronic brake system according to an embodiment of the disclosure. FIG. 2 is a cross-sectional view illustrating a master cylinder according to an embodiment of the disclosure. FIG. 3 is an exploded perspective view illustrating a first master piston of a master cylinder according to an embodiment of the disclosure. FIG. 4 is a partially enlarged view illustrating a first master piston of a master cylinder in an idle state according to an embodiment of the disclosure. FIG. 5 is a diagram illustrating a state where a communication channel of a first master piston is blocked according to an embodiment of the disclosure.

Referring to FIGS. 1 to 5, the electronic brake system according to an embodiment of the disclosure includes a reservoir 10, a master cylinder 100, one or more wheel cylinders 30, a hydraulic pressure supply device 40, a hydraulic control unit 50 and an electronic control unit (ECU). Here, the reservoir 10 stores a pressing medium, and the master cylinder 100 pressurizes or discharges the pressing medium included therein according to a pedal effort of a brake pedal 20. The wheel cylinders 30 perform braking of respective wheels RR, RL, FR, and FL upon receiving hydraulic pressure of the pressing medium. The hydraulic pressure supply device 40 generates hydraulic pressure of the pressing medium by mechanically operating upon receiving an electrical signal indicating a driver's braking intention from a pedal displacement sensor 21 sensing a displacement of the brake pedal 20. The hydraulic control unit 50 controls the hydraulic pressure applied to the wheel cylinders 30, and the ECU controls the hydraulic pressure supply device 40 and various valves based on hydraulic pressure information and pedal displacement information.

A pedal simulator 110 is built into the master cylinder 100, and when a driver applies a pedal effort to the brake pedal 20 for braking a vehicle, the master cylinder 100 provides the driver with reaction force corresponding to the pedal effort for stable pedal feel, and pressurizes and discharges the pressing medium included therein.

The master cylinder 100 includes a cylinder block 101, a first master piston 130, a second master piston 120 and the pedal simulator 110. The cylinder block 101 forms a chamber therein, and the first master piston 130 and the second master piston 120 are spaced apart in a row inside the cylinder block 101. The pedal simulator 110 is provided between the first master piston 130 and the second master piston 120.

A multi-stage bore is formed inside the cylinder block 101, and the bore in the cylinder block 101 includes a first master chamber 102 where the pressing medium is compressed by the first master piston 130 and a second master chamber 103 where the pressing medium is compressed by the second master piston 120.

The first master chamber 102 has a relatively bigger diameter than the second master chamber 103, and the pedal simulator 110 made of a rubber member is built into the first master chamber 102.

The pedal simulator 110 is provided between the first master piston 130 and the second master piston 120, and provides the driver with pedal feel through elastic restoring force generated when compressed.

The pressing medium in the first master chamber 102 may be flowed into and discharged from a first backup port 104 and the pressing medium in the second master chamber 103 may be flowed into and discharged from a second backup port 105.

When the hydraulic pressure supply device 40 may not operate normally, the first backup port 104 and the second backup port 105 are connected to backup passages 60 and 61 to directly supply hydraulic pressure of the pressing medium discharged from the master cylinder 100 to the hydraulic control unit 50.

A master spring 115 is placed in the second master chamber 103. When displacement occurs in the second master piston 120 according to an operation such as braking, etc., the master spring 115 is compressed to store elastic force, and then when the operation such as braking is released, the master spring 115 returns the second master piston 120 to an original position by the stored elastic force.

The pressing medium in the first master chamber 102 and in the second master chamber 103 may be flowed into and discharged through a first hydraulic port 106 and a second hydraulic port 107 formed in the cylinder block 101.

The first hydraulic port 106 is connected to a first reservoir passage 11 and allows the pressing medium to flow between the first master chamber 102 and the reservoir 10. The second hydraulic port 107 is connected to a second reservoir passage 12 and allows the pressing medium to flow between the second master chamber 103 and the reservoir 10.

The first master chamber 102 and the second master chamber 103 communicate with the reservoir 10 in an idle state when the brake pedal 20 does not operate.

The second master chamber 103 communicates with the reservoir 10 through a hole 121 in the idle state. The hole 121 is formed in the second master piston 120. When the second master piston 120 moves forward, the second master chamber 103 does not communicate with the second hydraulic port 107 by sealing members 122 and 123 and the second master piston 120. The sealing members 122 and 123 are installed before and after the second hydraulic port 107.

The first master chamber 102 communicates with the reservoir 10 through a communication channel formed in the first master piston 130 in the idle state.

The communication channel formed in the first master piston 130 is required to be blocked in a fallback mode and a diagnostic mode to prevent the pressing medium in the first master chamber 102 from leaking into the reservoir 10. In the fallback mode, when the electronic brake system may not operate normally, the wheel cylinders 30 may operate by directly supplying hydraulic pressure of the pressing medium discharged from the master cylinder 100 to the hydraulic control unit 50. In the diagnostic mode, whether the master cylinder 100 leaks is examined.

For the above, the first master piston 130 includes a first piston 140 and a second piston 150 that are coupled to be movable relative to each other. The communication channel that communicates with the first master chamber 102 is formed inside of the first piston 140 and the second piston 150.

The first piston 140 and the second piston 150 may be coupled to be close to or far from each other. That is, when the first piston 140 and the second piston 150 are moved to be in contact with each other, the communication channel that allows the first hydraulic port 106 to communicate with the first master chamber 102 is blocked. When the first piston 140 and the second piston 150 are moved to be far from each other, the blocking of the communication channel is released.

The first piston 140 has a hollow cylindrical shape, and may be divided into a front portion and a rear portion by a partition wall 141 installed therein.

A rod 22 connected to the brake pedal 20 is connected to the rear portion of the first piston 140, and the second piston 150 is slidably coupled to the front portion of the first piston 140.

A first communication chamber 142 communicating with the first hydraulic port 106 is formed inside the front portion of the first piston 140. A shaft portion 151 of the second piston 150 is slidably inserted through a front end opening of the first communication chamber 142. The shaft portion 151 of the second piston 150 is formed in the rear portion of the second piston 150.

A communication rod 143 in a cylindrical shape extending toward the second piston 150 from a center of the partition wall 141 is provided inside of the first communication chamber 142.

The first communication chamber 142 is formed between the communication rod 143 and the front portion of the first piston 140.

The second communication chamber 144 formed to be concave is provided along an axial direction of the communication rod 143 inside the front portion of the communication rod 143. Also, the second communication chamber 144 connects the first communication chamber 142 to a third communication chamber 152 formed inside of the first piston 140.

The second communication chamber 144 may be in a concave cylindrical shape along an axial direction of the communication rod 143 from a front end to a rear portion of the communication rod 143.

The first communication chamber 142 is connected to the first hydraulic port 106 connected to the reservoir 10 through a first communication hole 145. The first communication hole 145 is formed in the front portion of the first piston 140. The second communication chamber 144 is connected to the first communication chamber 142 through second communication holes 146 formed in the communication rod 143.

The first communication hole 145 formed in the first piston 140 is positioned to communicate with the first hydraulic port 106 in the idle state. When the first piston 140 moves forward, the first communication hole 145 does not communicate with the first hydraulic port 106 by sealing members 132 and 133 installed before and after the first hydraulic port 106.

A plurality of second communication holes 146 may be provided at predetermined intervals along a circumferential direction of the communication rod 143.

The third communication chamber 152 communicating with the first master chamber 102 is formed inside of the second piston 150. Also, the third communication chamber 152 is connected to the second communication chamber 144 formed inside of the communication rod 143 when the front end of the communication rod 143 is inserted.

The third communication chamber 152 is connected to the first master chamber 102 through a third communication hole 153 formed in the second piston 150.

That is, the communication channel P formed by the first piston 140 and the second piston 150 for communicating the reservoir 10 and the first master chamber 102 may include the first communication hole 145, the first communication chamber 142, the second communication hole 146, the second communication chamber 144, the third communication chamber 152, and the third communication hole 153.

A receiving part 154 partitioned to the third communication chamber 152 is provided inside of the front portion of the second piston 150 to receive an end of the pedal simulator 110.

A communication channel sealing member 160 is installed inside of the shaft portion 151 of the rear portion of the second piston 150 to block a portion of the communication channel P according to a relative movement of the first piston 140 and the second piston 150.

The communication channel sealing member 160 is in a lip seal shape. As shown in FIG. 4, the communication channel sealing member 160 is positioned to allow the pressing medium to flow between the first communication chamber 142 and the second communication chamber 144 through the second communication hole 146, in a state where the first piston 140 and the second piston 150 are spaced apart from each other at a predetermined distance by elastic force of an elastic member 170. As shown in FIG. 5, in a state where the first piston 140 and the second piston 150 are moved to be in contact with each other, the communication channel sealing member 160 blocks the pressing medium of the second communication chamber 144 from flowing into the first communication chamber 142 by sealing between an outer surface of the communication rod 143 and inside of the shaft portion 151.

The elastic member 170 may be placed inside of the first communication chamber 142 to provide elastic force in a direction where the first piston 140 and the second piston 150 are spaced apart in a state where external force is not applied to the first master piston 130.

The elastic member 170 may include a coil spring whose both ends are elastically supported by the partition wall 141 of the first piston 140 and a rear end of the shaft portion 151 of the second piston 150, respectively.

The hydraulic pressure supply device 40 may be provided in a variety of manners and structures. For example, hydraulic pressure may be transmitted to the hydraulic control unit 50 by pushing a pressing medium in a chamber by a piston that moves by driving force of a motor. Alternatively, the hydraulic pressure supply device 40 may be provided as a pump or a high pressure accumulator.

Specifically, when a driver applies a pedal effort to the brake pedal 20, the pedal displacement sensor 32 transmits an electrical signal in response to change in displacement of the brake pedal 20, and a motor operates by the electrical signal. Also, a power conversion unit for converting rotational motion of the motor into linear motion may be provided between the motor and the piston. The power conversion unit may include a worm and a worm gear and/or a rack and pinion gear, and the like.

The hydraulic control unit 50 may include a first hydraulic circuit 51 and a second hydraulic circuit 52. The first hydraulic circuit 51 controls hydraulic pressure supplied and transmitted to two wheel cylinders, and the second hydraulic circuit 52 controls hydraulic pressure transmitted to the other two wheel cylinders. For instance, the first hydraulic circuit 51 controls a front left wheel FL and a rear right wheel RR, and the second hydraulic circuit 52 controls a front right wheel FR and a rear left wheel RL, without being limited thereto. Positions of wheels connected to the first hydraulic circuit 51 and the second hydraulic circuit 52 may vary.

The hydraulic control unit 50 may include an inlet valve and an outlet valve. The inlet valve is provided in a front end of each of the wheel cylinders 30 and controls hydraulic pressure. The outlet valve is branched between the inlet valve and each of the wheel cylinders 30 and connected to the reservoir 10. Also, the hydraulic pressure supply device 40 may be connected to a front end of an inlet valve of the first hydraulic circuit 51 by a first hydraulic passage 70, and be connected to a front end of an inlet valve of the second hydraulic circuit 52 by a second hydraulic passage 71. Also, hydraulic pressure of brake fluid generated and provided by the hydraulic pressure supply device 40 may be supplied to the first hydraulic circuit 51 and the second hydraulic circuit 52 through the first hydraulic passage 70 and the second hydraulic passage 71, respectively.

When the electronic brake system may not operate normally due to a failure of the hydraulic pressure supply device 40, backup passages 60 and 61 directly supply the hydraulic pressure of the pressing medium discharged from the master cylinder 100 to the hydraulic control unit 50 to implement braking of the wheel cylinders 30. That is, the backup passages 60 and 61 are used in the fallback mode.

The backup passages 60 and 61 includes the first backup passage 60 connecting the first master chamber 102 to the first hydraulic circuit 51 and the second backup passage 61 connecting the second master chamber 103 and the second hydraulic circuit 52.

A cut valve 63 for controlling flow of the pressing medium may be installed in the second backup passage 61. The cut valve 63 may be a normal open type solenoid valve that is normally open and operates to close when a closed signal is received from the ECU.

A cut valve may be installed in the first backup passage 60 like the second backup passage 61. However, according to an embodiment of the disclosure, a separate cut valve is not installed in the first backup passage 60 for simplification of configuration by reducing the number of valves, and the first backup passage 60 may be connected to the outlet valve so that the outlet valve in the first hydraulic circuit 51 functions as the cut valve.

A reference numeral PS1 is a backup passage pressure sensor for measuring hydraulic pressure of the master cylinder 100, and a reference numeral PS2 is a hydraulic passage pressure sensor for sensing hydraulic pressure of the hydraulic circuit.

Also, a reference numeral 13 is a simulator check valve that allows flow only of the pressing medium from the reservoir 10 to the first master chamber 102. A reference numeral 14 is a simulator valve that controls bidirectional flow of the pressing medium transmitted through a simulation passage 15. The simulator valve 14 may be a normal closed type solenoid valve that is normally closed and operates to be open when an electrical signal is received from the ECU.

Hereinafter, operations of the master cylinder in the fallback mode and in the diagnostic mode according to an embodiment of the disclosure are described in detail. FIG. 6 is an operational state diagram illustrating an electronic brake system in a fallback mode according to an embodiment of the disclosure. FIG. 7 is an operational state diagram illustrating an electronic brake system in a diagnostic mode according to an embodiment of the disclosure.

As shown in FIG. 6, when the hydraulic pressure supply device 40 is unable to operate normally and a pedal effort is applied to the brake pedal 20, the first master piston 130 connected to the brake pedal 20 moves forward.

Specifically, after the first piston 140 connected to the brake pedal 20 moves forward toward and is in contact with the second piston 150, the first piston 140 and the second piston 150 move together. Accordingly, the first hydraulic port 106 is blocked by an outer surface of the first piston 140 due to the forward movement of the first master piston 130, the pressing medium in the first master chamber 102 may be pressurized and transmitted to the first hydraulic circuit 51 through the first backup passage 60. Also, the second hydraulic port 107 is blocked by a forward movement of the second master piston 140, the pressing medium in the second master chamber 103 may be pressurized and transmitted to the second hydraulic circuit 52 through the second backup passage 71. Accordingly, braking of the wheel cylinders 30 may be implemented.

Meanwhile, when the diagnostic mode for examining the leak of the master cylinder 100 is implemented, the ECU controls the cut valve 63 provided in the second backup passage 61 to be closed, and then controls hydraulic pressure generated from the hydraulic pressure supply device 40 to be supplied to the first master chamber 102 of the master cylinder 100.

In this instance, the hydraulic pressure generated from the hydraulic pressure supply device 40 sequentially passes the first hydraulic passage 70, the first hydraulic circuit 51, and the first backup passage 60, and is transmitted to the first master chamber 102 through the first backup port 104.

The hydraulic pressure supplied to the first master chamber 102 pressurizes the second piston 150 to move toward the first piston 140. When the second piston 150 moves backward and is in contact with the first piston 140, as shown in FIG. 5, the communication channel sealing member 160 provided inside the shaft portion 151 of the second piston 150 blocks the first communication chamber 142 and the second communication chamber 144 from communicating with each other.

Accordingly, the pressing medium in the first master chamber 102 is blocked from leaking into the reservoir 10 through the communication channel P.

Afterwards, the ECU may identify whether the master cylinder 100 is leaked, by comparing hydraulic pressure measured in the pressure sensors PS1 and PS2.

Although embodiments of the disclosure have been described with reference to the accompanying drawings, a person having ordinary skilled in the art will appreciate that other specific modifications may be easily made without departing from the technical spirit or essential features of the disclosure. Therefore, the foregoing embodiments should be regarded as illustrative rather than limiting in all aspects.

The invention claimed is:

1. A master cylinder for an electronic brake system, comprising:
   a cylinder block having a first master chamber pressurized by a first master piston and a second master chamber pressurized by a second master piston, the first master piston moving relative to an operation of a brake pedal;
   a first hydraulic port formed in the cylinder block to provide a pressing medium of a reservoir to the first master chamber; and
   a pedal simulator provided between the first master piston and the second master piston and having a rubber member that provides reaction force to the brake pedal,
   wherein the first master piston comprises:
   a first piston and a second piston coupled to be movable relative to each other and having a communication channel to allow the pressing medium to flow between the first hydraulic port and the first master chamber;
   a communication channel sealing member installed between the first piston and the second piston to block a portion of the communication channel according to a relative movement of the first piston and the second piston; and an elastic member configured to provide elastic force in a direction in which the first piston and the second piston are spaced apart to prevent the communication channel from being blocked by the communication channel sealing member.

2. The master cylinder for the electronic brake system of claim 1, further comprising:
a sealing member installed in the cylinder block to prevent the first hydraulic port and the communication channel from communicating with each other when the first piston moves forward toward the second piston.

3. The master cylinder for the electronic brake system of claim 1, wherein, in a fallback mode, the first piston moves forward by a pedal effort of the brake pedal to block the first hydraulic port, and
in a diagnostic mode, the second piston moves backward by pressure of the pressing medium flowed into the first master chamber and the communication channel is blocked by the communication channel sealing member.

4. The master cylinder for the electronic brake system of claim 1, wherein the first piston comprises a first communication hole that communicates with the first hydraulic port, a first communication chamber that communicates with the first communication hole inside a front portion of the first piston, a communication rod that protrudes from a center of the first communication chamber toward the second piston and has a second communication chamber connected to the first master chamber through the second piston, and a second communication hole formed in the communication rod to allow the first communication chamber and the second communication chamber to communicate with each other.

5. The master cylinder for the electronic brake system of claim 4, wherein the communication channel sealing member blocks the first communication chamber and the second communication hole from communicating with each other when the second piston moves backward.

6. The master cylinder for the electronic brake system of claim 4, wherein the elastic member has both ends supported by the first piston and the second piston, respectively, while being received in the first communication chamber, to provide elastic force in the direction in which the first piston and the second piston are spaced apart.

7. The master cylinder for the electronic brake system of claim 4, wherein the communication channel sealing member is installed in an inner circumference of a rear portion of the second piston, the first communication chamber is slidably coupled to an outer circumference of the rear portion of the second piston,
a third communication chamber that communicates with the second communication chamber is formed inside of the second piston, and the third communication chamber communicates with the first master chamber through a third communication hole formed in the second piston.

8. The master cylinder for the electronic brake system of claim 7, wherein the communication channel comprises the first communication hole, the first communication chamber, the second communication hole, the second communication chamber, the third communication chamber, and the third communication hole.

9. The master cylinder for the electronic brake system of claim 7, wherein a receiving part formed to be concave is provided inside a front portion of the second piston to receive a rear end of the rubber member.

10. The master cylinder for the electronic brake system of claim 1, wherein the first master chamber has a relatively bigger diameter than the second master chamber.

11. The master cylinder for the electronic brake system of claim 2, wherein both ends of the rubber member are supported by the second piston and the second master piston, respectively.

12. The master cylinder for the electronic brake system of claim 4, wherein an inside of the first piston is divided into a front portion and a rear portion by a partition wall,
and the rear portion of the first piston is connected to a rod connected to the brake pedal, and the front portion of the first piston is slidably coupled to a shaft portion of the second piston.

13. The master cylinder for the electronic brake system of claim 4, wherein the first communication hole is positioned to communicate with the first hydraulic port in an idle state, and the first communication hole does not communicate with the first hydraulic port when the first piston moves forward.

14. The master cylinder for the electronic brake system of claim 9, wherein the third communication chamber and the receiving part are partitioned inside of the second piston.

15. The master cylinder for the electronic brake system of claim 12, wherein the communication rod is in a cylindrical shape extending from a center of the partition wall,
a plurality of second communication holes are provided at predetermined intervals along a circumferential direction of the communication rod,
the first communication chamber is formed in an outer space of the communication rod inside the first piston, and
the second communication chamber is formed in a concave cylindrical shape along an axial direction of the communication rod toward a rear portion of the communication rod from a front end of the communication rod.

* * * * *